US009272836B2

(12) United States Patent
Ramachandran et al.

(10) Patent No.: US 9,272,836 B2
(45) Date of Patent: Mar. 1, 2016

(54) CONTAINER (71) Applicant: GlaxoSmithKline, LLC, Wilmington, DE (US)

(72) Inventors: Ramesh Ramachandran, Haryana (IN); Amit Sabharwal, Haryana (IN); Sukhdev Singh Saini, Haryana (IN)

(73) Assignee: GlaxoSmithKline, LLC, Wilmington, New Castle, DE (US)

( * ) Notice: Subject to any disclaimer, the term of this patent is extended or adjusted under 35 U.S.C. 154(b) by 0 days.

(21) Appl. No.: 14/420,391

(22) PCT Filed: Aug. 8, 2013

(86) PCT No.: PCT/US2013/054041
§ 371 (c)(1),
(2) Date: Feb. 9, 2015

(87) PCT Pub. No.: WO2014/025950
PCT Pub. Date: Feb. 13, 2014

(65) Prior Publication Data
US 2015/0203277 A1 Jul. 23, 2015

(30) Foreign Application Priority Data
Aug. 9, 2012 (IN) .......................... 2498/DEL/2012

(51) Int. Cl.
*G01F 11/28* (2006.01)
*B65D 83/06* (2006.01)
*B65D 47/08* (2006.01)
*B65D 47/06* (2006.01)
*G01F 11/40* (2006.01)

(52) U.S. Cl.
CPC ................ *B65D 83/06* (2013.01); *B65D 47/06* (2013.01); *B65D 47/0847* (2013.01); *G01F 11/40* (2013.01); *B65D 2101/0038* (2013.01)

(58) Field of Classification Search
CPC ........... B65D 2101/0038; B65D 38/06; B65D 47/06; B65D 47/0847; G01F 11/40
USPC ................... 222/425, 450–455, 142.5, 142.8, 222/522–525
See application file for complete search history.

(56) References Cited

U.S. PATENT DOCUMENTS

| 3,148,804 | A | | 9/1964 | James | |
|---|---|---|---|---|---|
| 4,109,530 | A | * | 8/1978 | Kim | ........................ G01F 19/00 600/584 |
| 4,579,256 | A | * | 4/1986 | Heimlich | ................. G01F 11/14 222/162 |
| 4,724,984 | A | * | 2/1988 | Wilken | .............. B65D 83/0409 221/266 |
| 4,958,749 | A | * | 9/1990 | Kuenzel | ................ G01F 11/261 222/133 |
| 5,480,071 | A | * | 1/1996 | Santagiuliana | ........ G01F 11/261 220/254.2 |
| 5,971,216 | A | | 10/1999 | Robbins, III | |
| 6,892,905 | B2 | * | 5/2005 | Cousseau | .............. G01F 11/262 222/438 |

(Continued)

*Primary Examiner* — Lien Ngo
(74) *Attorney, Agent, or Firm* — Alison B. Kessler; Theodore R. Furman (57) ABSTRACT

Aspects of the present invention are directed to a metered dose container that is transit proof. A container of the present invention may comprise a body having a vertical axis; a cap movable along the vertical axis of the body; a removable ring coupled to and between the moveable cap and the body, and a barrier, inside the body and coupled to the moveable cap. The barrier may define a loading chamber and separate the body into a storage chamber and a dispensing chamber. The barrier is adapted to be movable along the vertical axis of the body to form a transit position and a dispensing position.

11 Claims, 8 Drawing Sheets

(56) References Cited

U.S. PATENT DOCUMENTS

| | | | |
|---|---|---|---|
| 7,032,787 B2 * | 4/2006 | Sherk, Jr. | G01F 11/24 222/156 |
| 8,210,167 B2 | 7/2012 | Corbacho | |
| 2013/0168418 A1 * | 7/2013 | Druyan | A47G 19/2266 222/454 |
| 2015/0028063 A1 * | 1/2015 | Skillin | G01F 11/261 222/455 |

* cited by examiner

CONTAINER

This application is a 371 of International Application No. PCT/US2013/054041, filed Aug. 8, 2013, which claims the priority of IN Application No. IN 2498/DEL/2012 filed Aug. 9, 2012, which is incorporated herein in its entirety.

FIELD OF THE INVENTION

Aspects of the present invention are directed to a metered dose container, and in particular, a metered dose container that is transit proof.

BACKGROUND OF THE INVENTION

The ability to dispense accurate amounts of dry material from containers has been investigated for several decades. In particular, powders or particles consumed for health or medicinal purposes may often require accurate amounts to be either consumer directly or more often, dissolved in a liquid and then consumed. Current metered dose containers have drawbacks. For example, if the container is inadvertently inverted or dropped during transit, the next dose of material dispensed from the container will have an inaccurate amount of material because additional material has been released into the dispensing chamber of the container. Furthermore, the last dose in the container may have less than the anticipated amount because of the inaccurate amounts dispensed previously. In addition to dispensing inaccurate amounts of material, which could lead to lack of efficacy of the product or adverse side effects because of too much consumption, this inaccurate dosing may also lead to product waste. Thus, a metered dose device that does not suffer from the drawbacks of traditional metered dose containers would be highly desirable.

SUMMARY OF THE INVENTION

Aspects of the present invention are directed to a container comprising a body having a vertical axis, a cap movable along the vertical axis of the body, a removable ring coupled to and between the moveable cap and the body, and a barrier inside the body and coupled to the moveable cap. The barrier may define a loading chamber and may separate the body into a storage chamber and a dispensing chamber. The barrier is adapted to be movable along the vertical axis of the body to form a transit position and a dispensing position. The cap and barrier may be moved back to the transit position after the material has been dispensed.

In certain embodiments, the movable barrier comprises a long arm, forming the dispensing chamber and a shorter arm, forming the storage chamber. The long arm may comprise a barrier opening at the bottom to provide access from the loading chamber to the dispensing chamber. The barrier opening may be adapted to provide a metered amount of material to be dispensed from the container. In certain embodiments, the metered amount may be between about 1 gram and about 10 grams, or between about 3 grams and about 6 grams. In another embodiment, the metered amount is about 5 grams.

The movable barrier may also comprise a sloped barrier bottom that is sloped from the short arm to the long arm. The body may comprise an inclined base on which the sloped barrier bottom may sit. In addition, the body may comprise a wall positioned to block the barrier opening when the barrier is in the transit position. The body may also comprise a wall positioned to prevent infiltration of material between the sloped barrier bottom and the inclined base of the body when the barrier is in transit position. In certain embodiments, the cap may comprise a flip top to access material within the dispensing chamber. In another embodiment, the cap may also comprise a resealable opening opposite the flip top to access material directly from the storage chamber.

DETAILED DESCRIPTION OF THE INVENTION

Aspects of the present invention are directed to a metered dose container. The metered dose container may have two modes—a transit mode and a dispensing mode. In transit mode, material cannot be dispensed from the container or dosed within the container. For example, if the container is inadvertently knocked over or turned upside down, no material will be dosed within the container and, therefore, the next dispensing of material from the container will have the correct amount of material. In dispensing mode, material can be dosed within the container and dispensed from the container. In certain embodiments of the present invention, the container can be repositioned from dispensing mode to transit mode, for storage purposes.

Metered dose containers of the present invention contain a body, a moveable cap, a removable ring, and a barrier. Inside the body may be the material to be dispensed and the barrier. The barrier is moveable along the vertical axis of the body. The moveable cap is positioned on the top of body and is also movable along the vertical axis of the body. The removable ring sits between the movable cap and the body of the container and is coupled to both. The removable ring serves two functions. First, when coupled to the cap and body, the removable ring allows for the movable cap and the barrier to sit in transit position (that is, preventing material to be dosed and dispensed). Second, the removable ring serves as a tamper indicator. When the removable ring is removed from the container, the moveable cap can be moved in a downward direction, forcing the barrier in a downward direction, placing the container into dispensing position.

Figure 1:
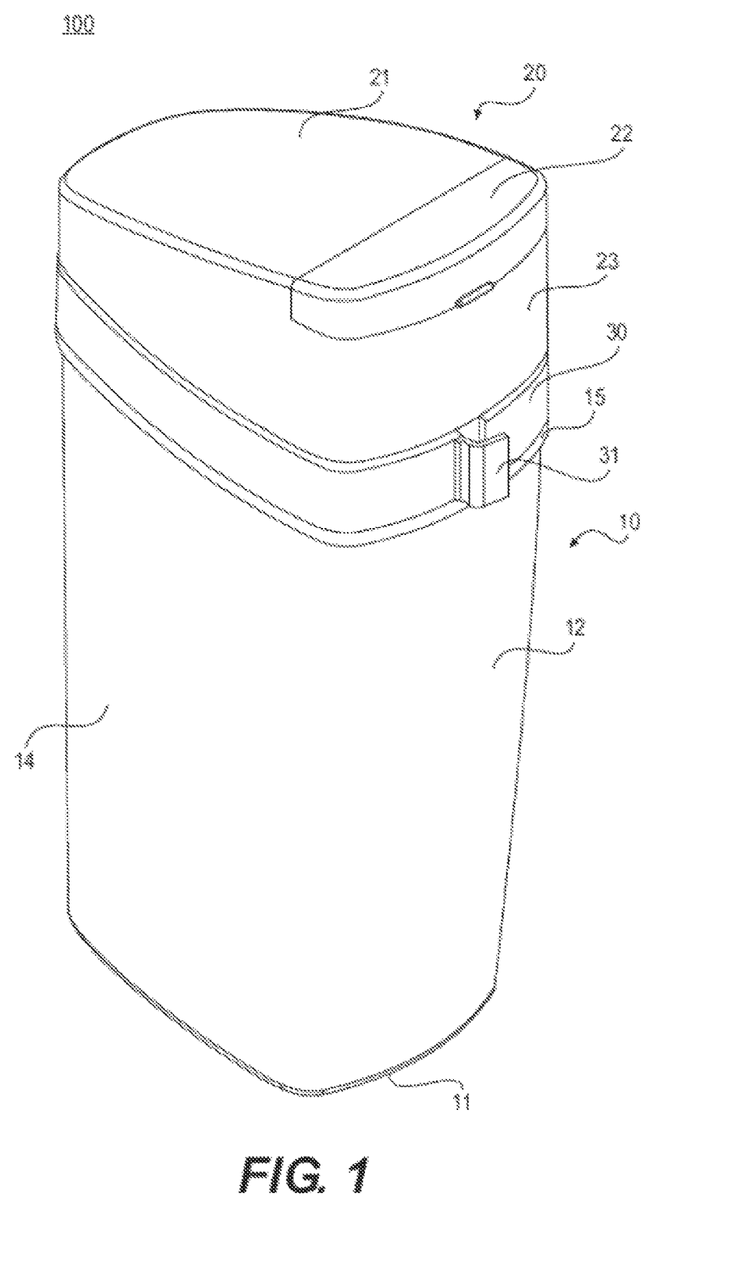
FIG. 1 shows a perspective view of a metered dose container in transit mode.
Figure 7:
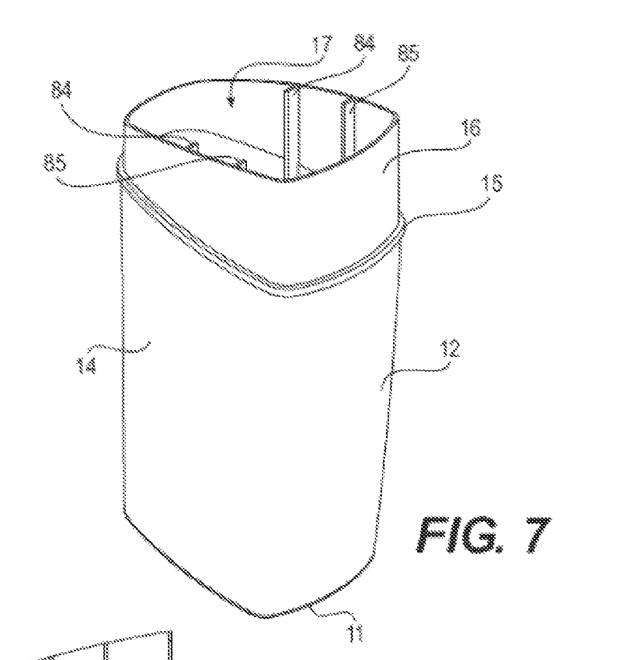
FIG. 7 shows a perspective view of a body of a metered dose container.
Figure 8:
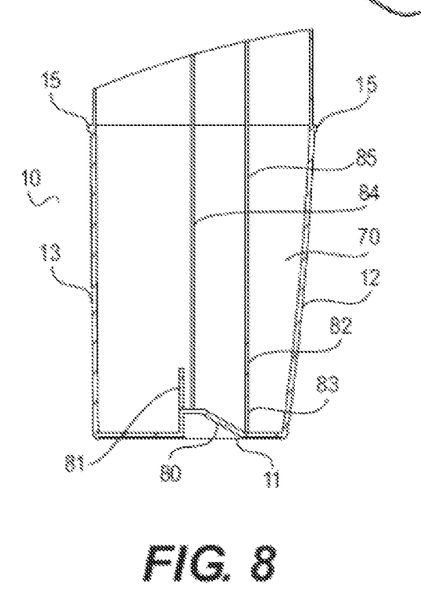
FIG. 8 shows a cross sectional view of a body of a metered dose container.
Figure 9:
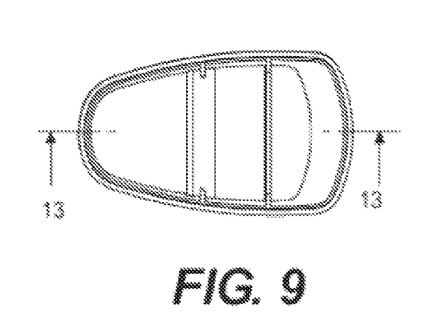
FIG. 9 shows a top view of a metered dose container.

An embodiment of a metered dose container in transit mode 100 is shown in FIG. 1. In transit mode, the container can be knocked over or upended and the next dispensing of material from the container contains the correct amount of material. Metered dose container in transit mode 100 includes body 10 having bottom 11, front wall 12, rear wall 13 (FIG. 2), and side walls 14. Front wall 12 is sloped to allow for ease of dispensing material from the container. Body 10 also includes rim 15, shoulder 16 (FIG. 7), and opening 17 (FIG. 7). Container 100 also includes a movable cap 20 having top 21, flip lid 22, and side 23 and removable ring 30 having tab 31 for removing the ring from the container. Ring 30 is coupled to cap 20 and body 10. Ring 30 is coupled with cap 20 and body 10 such that container is sealed to prevent tampering with material inside the container prior to opening. Ring 30 is removably coupled to cap 20 and body 10 to allow for removal of ring 30 to convert container from transit mode 100 to dispensing mode 200.

Figure 2:
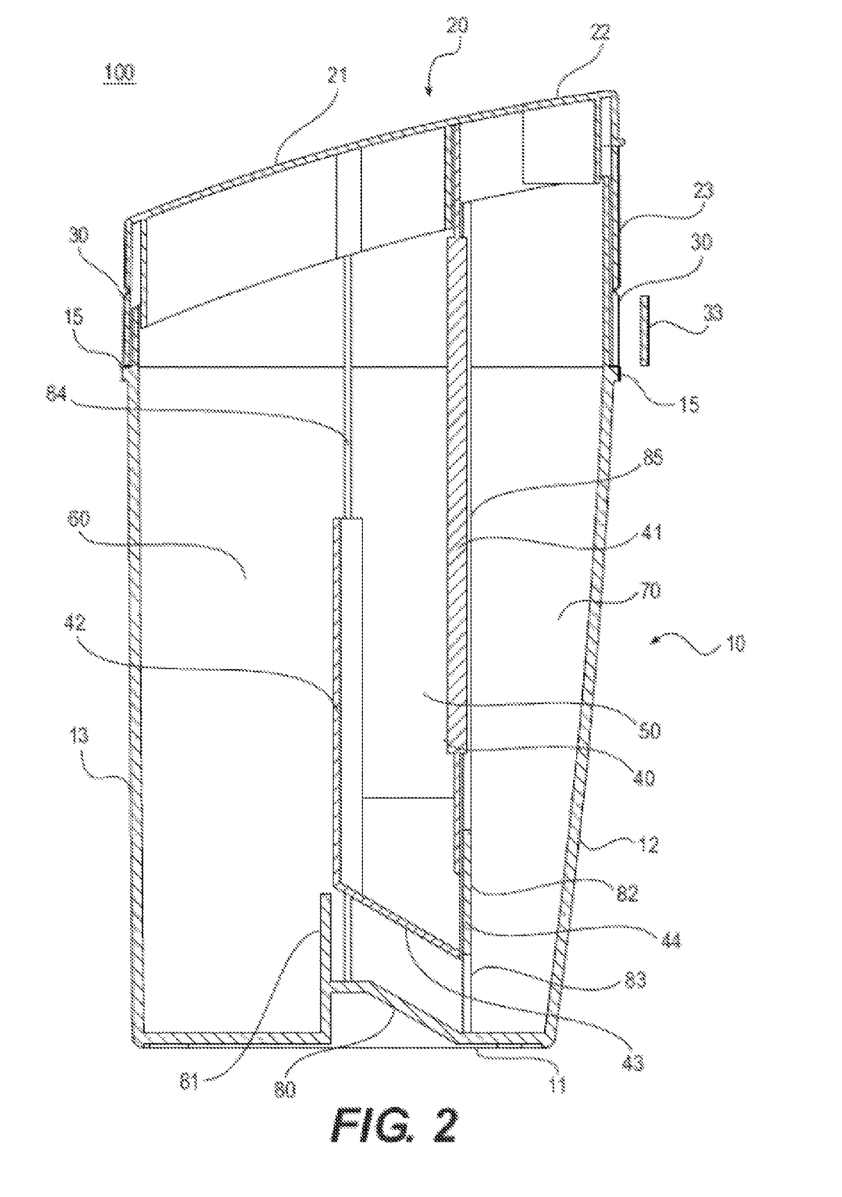
FIG. 2 shows a cross sectional view of a metered dose container in transit mode.

A cross sectional view of metered dose container in transit mode 100 is shown in FIG. 2. Inside container 100 is barrier 40 formed by long arm 41, short arm 42 and sloped barrier bottom 43. Barrier 40 is coupled to movable cap 20. Barrier 40 may be permanently coupled to movable cap 20 or barrier 40 can be detachably coupled to movable cap 20. Alternatively, movable cap 20 and barrier 40 can be manufactured so that they are monolithic. Where long arm 41 meets sloped barrier bottom 43 is barrier opening 44. The space between long arm 41 and short arm 42 defines loading area 50. The space between short arm and back wall 13 of body 10 defines storage zone 60 and the space between long arm front wall 14 of body 10 defines dispensing zone 70. Dispensing zone 70 remains while the container is in dispensing mode 100. Body also contains inclined base 80 onto which sloped barrier bottom 43 rests when barrier is in the dispensing position. Body 10 also contains rear blocking wall 81 to prevent material from the storage area from entering the space between sloped barrier bottom 43 and inclined base 80 when barrier 40 is in transit mode. Front blocking wall 82, attached to body 10, is positioned such that when barrier 40 is in transit mode, barrier opening 44 is blocked to prevent any material in loading zone 50 from exiting into dispensing zone 70. Body 10 also includes body opening 83 below front blocking wall 82. Body opening 83 is positioned so that when barrier is in dispensing mode, barrier opening 44 corresponds to body opening 83 allowing material from loading zone 50 to flow into dispensing zone 70. The internal walls of body 10 contain tracks designed to assist movement of barrier 40 from the travel position to the dispensing position. Short wall guide 84 is designed to engage barrier short wall 42 and long wall guide 85 is designed to engage barrier long wall 41.

Figure 3:
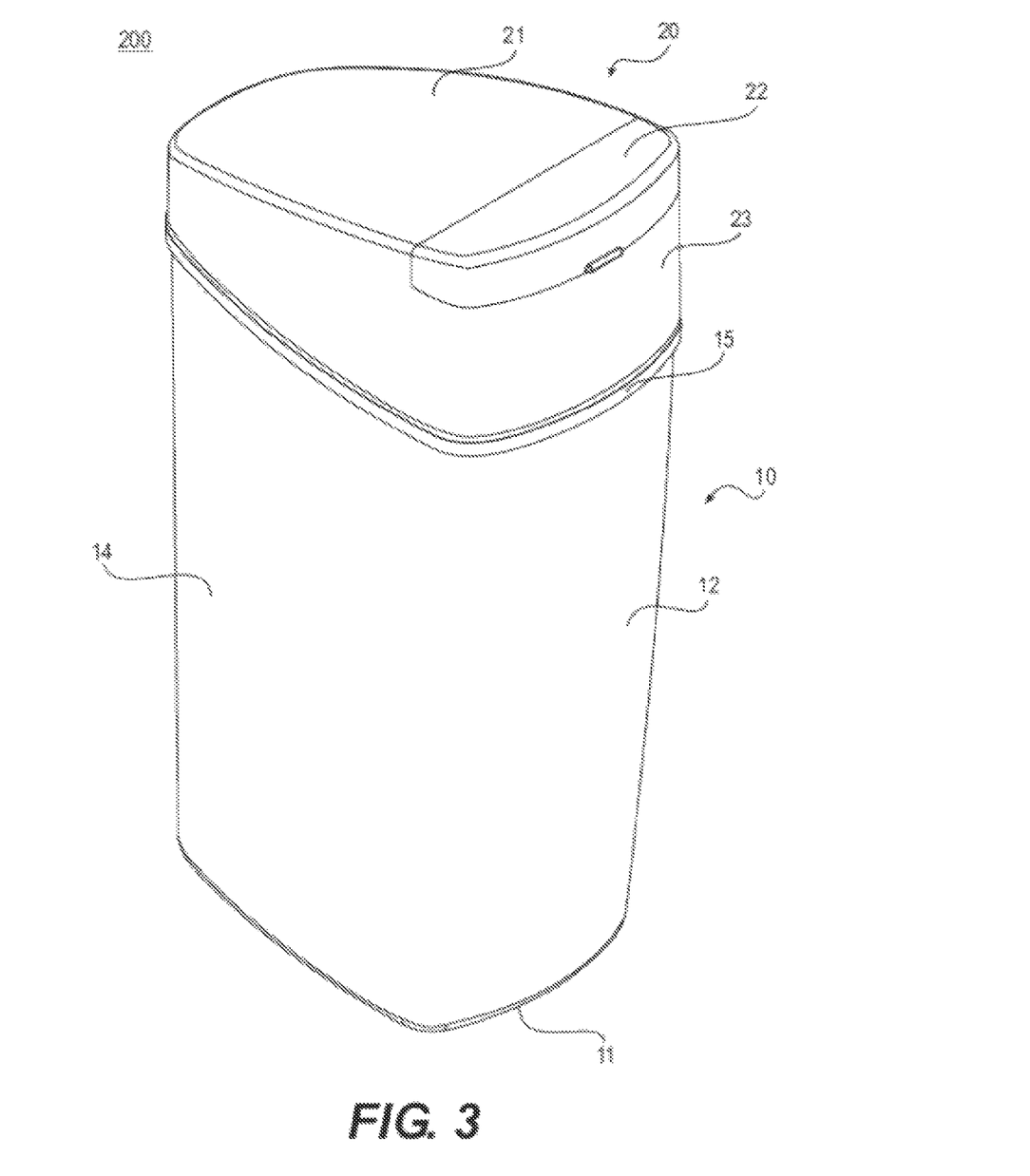
FIG. 3 shows a perspective view of a metered dose container in dispensing mode.
Figure 4:
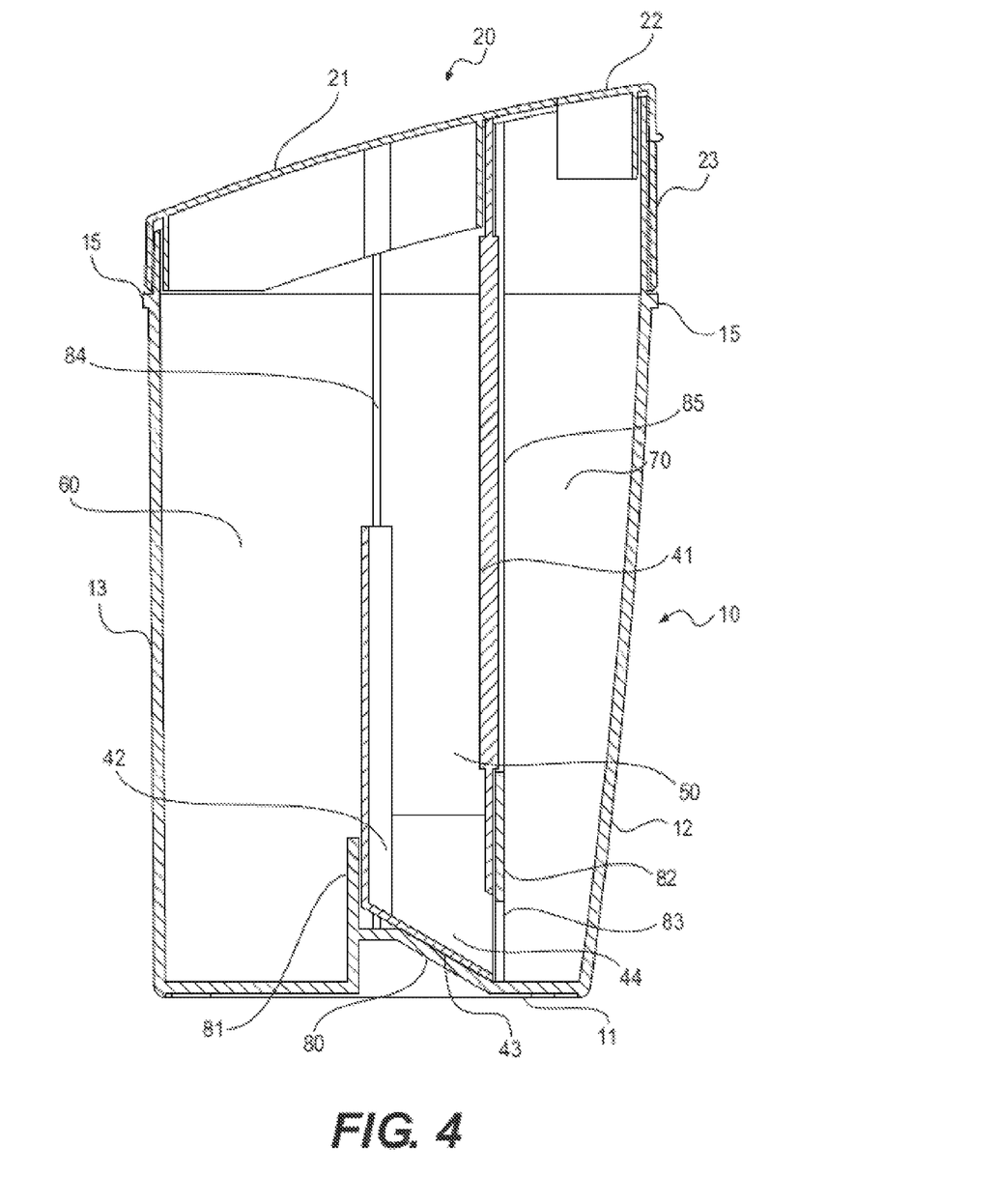
FIG. 4 shows a cross sectional view of a metered dose container in dispensing mode.

FIG. 3 shows an embodiment of metered dose container in dispensing mode 200. In dispensing mode 200, tamper ring 30 has been removed. Upon removal of tamper ring 30, pressure can be applied to cap 20, pushing the cap downward along the vertical axis of the body to place cap 20 in contact with rim 15. Application of downward pressure to cap 20 also moves barrier 40 along the vertical axis of the body and into dispensing position (FIG. 4). In dispensing mode 200, barrier opening 44 corresponds to body opening 83, allowing material to travel from loading zone 50 to dispensing zone 70. In addition, sloped barrier bottom 43 rests on inclined base 80. Rear blocking wall 81 prevents material from interfering with slope barrier bottom 43 from resting directly on inclined base 80.

Figure 5:
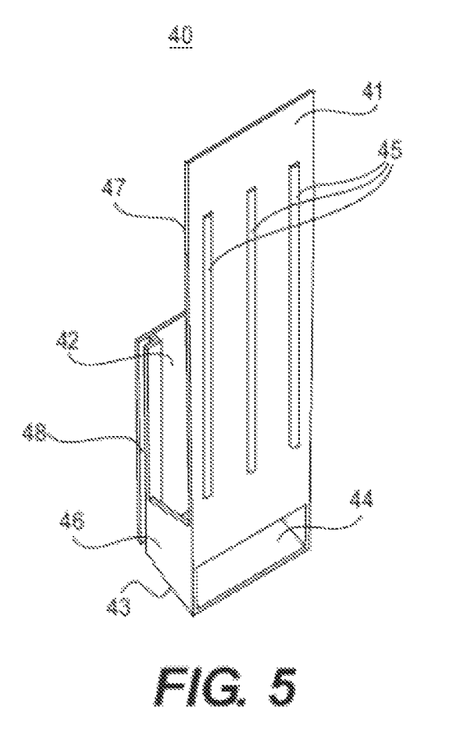
FIG. 5 shows a perspective view of a movable barrier.
Figure 6:
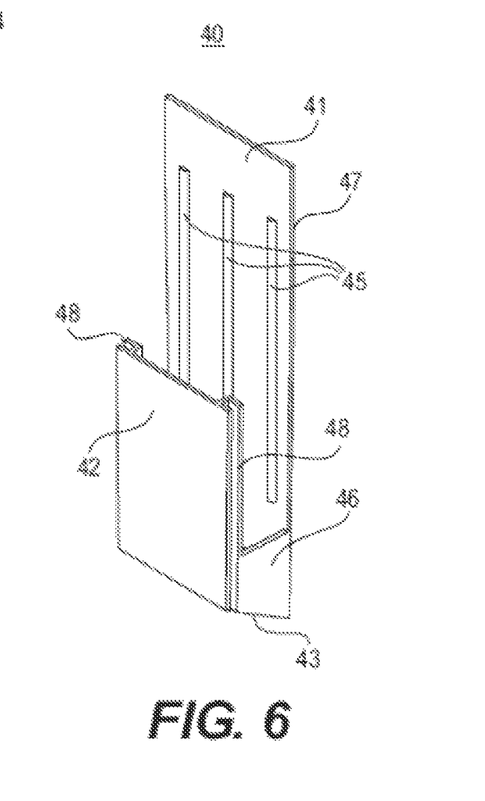
FIG. 6 shows a perspective view of a movable barrier.

FIGS. 5 and 6 show perspective views of barrier 40. Barrier 40 has long arm 41, short arm 42, sloped barrier bottom 43, and barrier opening 44. Barrier 40 also includes connector sides 46 and ridges 45 on long arm 41. Long arm edges 47 are designed to engage long wall guide 85. Short wall guide 84 is designed to engage short wall tracks 48 on barrier 40. The edges, guides, and tracks are designed to allow smooth movement of the guide from transit to dispensing mode and from dispensing mode back to transit mode, if required. The varied length of barrier arms 41 and 42 allows material to flow is a zigzag pattern to allow more accurate metered dispensing. In addition, barrier opening 44 can be designed to dispense a desired amount of material.

Figure 10:
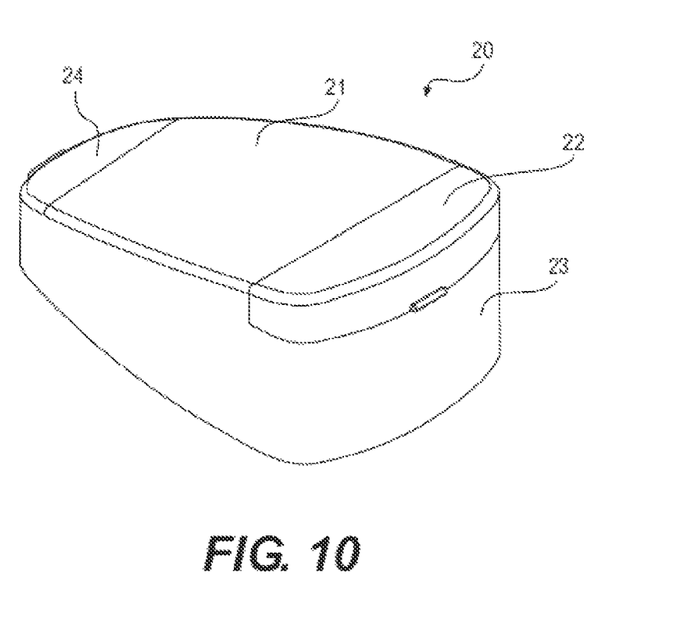
FIG. 10 shows a perspective view of an embodiment of a cap.

In certain embodiments, the barrier opening may be designed to dispense between about 1 and 10 grams of material, or for example, between about 3 and 6 grams of material. In another embodiment, the barrier opening is designed to dispense 5 grams of material. In certain embodiments, the cap may also include a resealable opening 24 on the opposite end of cap from flip the lid (FIG. 10). Resealable opening 24 allows material to be dispensed from the storage zone, circumventing the metered dose mechanism, when the user does not need a specific amount of material. Material can either be scooped out from the container or the container can be tilted to make the product flow out freely.

Various materials can be contained within the metered dose container. For example, the material may be Powders, Powdered/granular beverages, Cereals, Pulses, salt, pepper, sugar. In a preferred embodiment, the material is a consumer healthcare formulation, such as for example, ENO (sodium bicarbonate, citric acid).

The container may be designed to hold various amounts of material. For example, the container may hold between about 10 grams and about 2000 grams, preferably between about 50 grams and about 500 grams.

The container may have a total height of between about 8 cm and about 20 cm, a length of between about 4 cm and about 18 cm, and a width of between about 4 cm and about 12 cm. The cap may have a height of between about 2.5 cm and about 7 cm. The removable ring may have a height of between about 3 cm and about 7 cm.

In certain embodiments, the movable cap, removable ring, body, and barrier may be made of the same or different materials. On skilled in the art would recognize the materials that can be used to make the metered dose container. Suitable materials may be plastics, polypropylene, high density polyethylene, polyethylene terephthalate, wood, metal, coextruded structure, aluminum, glass, paper, paperboard, synthetic material, nylon. In a preferred embodiment, the material may be polypropylene.

Figure 11:
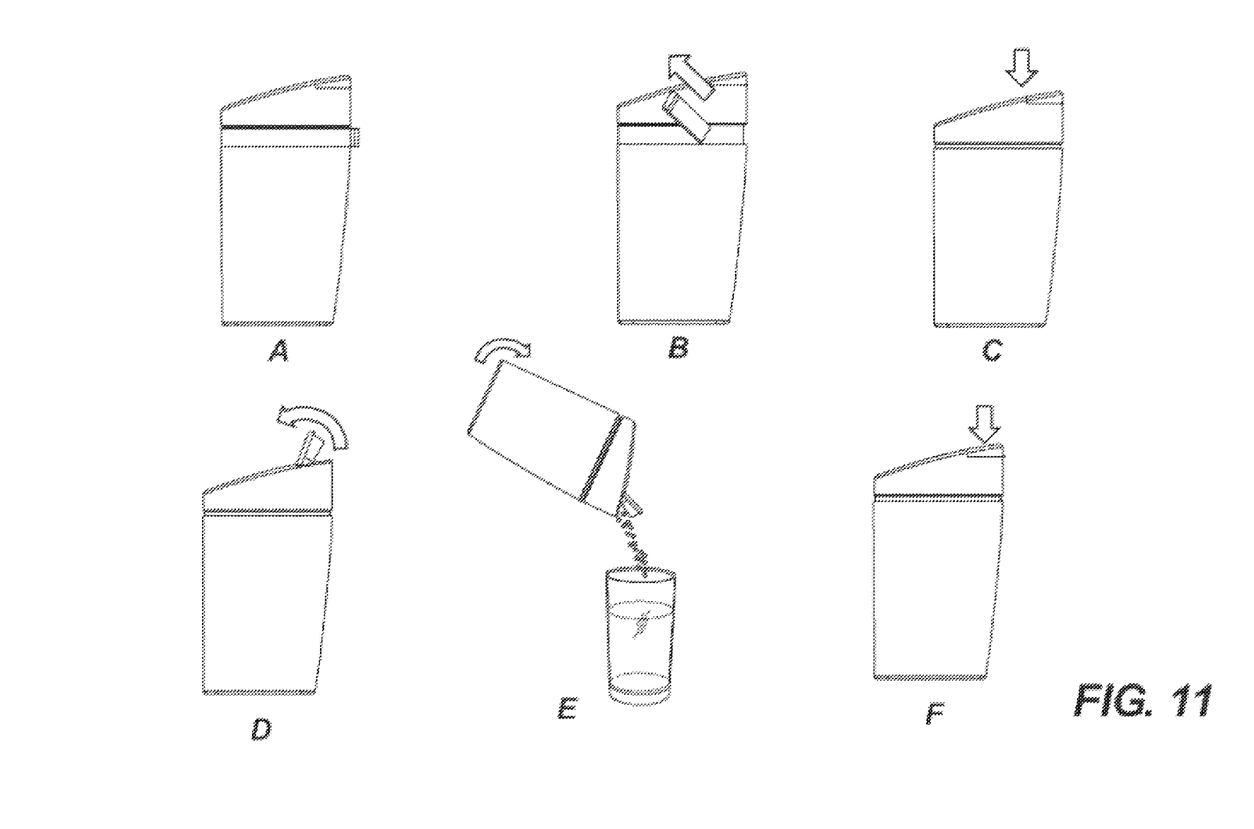
FIG. 11 shows a method of using a metered dose container of the present invention.

FIG. 11 shows a method of using a metered dose container of the present invention. FIG. 11A shows the metered dose container in transit mode. To convert from transit mode to dispensing mode, the ring is removed from the container (FIG. 11B) exposing body shoulder. Upon removal of the ring from the container, the cap and movable barrier (not shown) can be pushed in a downward manner along the vertical axis of the body to engage with body lip and place the container in dispensing mode (FIG. 11C). To dispense, the flip lid of the cap is opened (FIG. 11D) and the container is inverted to dispense material into the desired vessel (FIG. 11E). The flip lid can be closed to reseal the container (FIG. 11F). In certain embodiments, the cap (and the barrier coupled to cap) can be raised after dispensing to place container back into transit mode. Because the ring is not longer attached to cap and body, various techniques can be used to keep cap and barrier from sliding back down to dispensing mode, such as for example frictional forces between cap and shoulder and between the barrier the long arm edges and the short wall tracks and the wall guides.

What is claimed is:
1. A container comprising:
a body having a vertical axis;
a cap movable along the vertical axis of the body;
a removable ring coupled to and between the moveable cap and the body, and a barrier, inside the body and coupled to the moveable cap, defining a loading chamber and separating the body into a storage chamber and a dispensing chamber wherein the barrier is adapted to be movable along the vertical axis of the body to form a transit position and a dispensing position.

2. The container of claim 1, wherein the movable barrier comprises a long arm, forming the dispensing chamber and a shorter arm, forming the storage chamber, wherein the long arm comprises a barrier opening at the bottom to provide access from the loading chamber to the dispensing chamber.

3. The container of claim 1, wherein the movable barrier comprises a bottom that is sloped from the short arm to the long arm and the body comprises an inclined base on which the sloped moveable barrier bottom can sit.

4. The container of claim 3, wherein the body comprises a wall positioned to block the barrier opening when the barrier is in the transit position.

5. The container of claim 3, wherein the body comprises a wall positioned to prevent infiltration of material between the bottom of the movable barrier and the inclined base of the body when the barrier is in transit position.

6. The container of claim 2, wherein the barrier opening is adapted to provide a metered amount of a substance from the container.

7. The container of claim 6, wherein the metered amount is between about 1 gram and about 10 grams.

8. The container of claim 7, wherein the metered amount is between about 3 grams and about 6 grams.

9. The container of claim 8, wherein the metered amount is about 5 grams.

10. The container of claim 1, wherein the cap comprises a flip top to access material within the dispensing chamber.

11. The container of claim 10, wherein the cap further comprises a resealable opening opposite the flip top to access material directly from the storage chamber.

* * * * *